United States Patent [19]

Starkey

[11] 3,711,820
[45] Jan. 16, 1973

[54] ACOUSTIC DIRECTION SENSING SYSTEMS

[75] Inventor: Bertrand Julian Starkey, Dartmouth, Nova Scotia, Canada

[73] Assignee: Electric & Musical Industries Limited, Middlesex, England

[22] Filed: June 4, 1970

[21] Appl. No.: 43,395

[30] Foreign Application Priority Data

July 16, 1969 Great Britain.....................35,715/69

[52] U.S. Cl.......................340/2, 340/6 R, 343/118
[51] Int. Cl.................................................G01s 3/00
[58] Field of Search..........340/2, 6 R, 16 R; 343/118

[56] References Cited

UNITED STATES PATENTS

| | | | |
|---|---|---|---|
| 3,464,056 | 8/1969 | Ziehm et al............................340/6 R |
| 3,148,351 | 9/1964 | Bartlett...............................340/6 R X |
| 3,319,218 | 5/1967 | Zefting..................................340/6 R |

Primary Examiner—Richard A. Farley
Attorney—Fleit, Gipple & Jacobson

[57] ABSTRACT

An acoustic detection system is disclosed. A rotating cardioidal shaped directive pattern of a transducing arrangement is produced by generating a first local signal, the value of which corresponds to the sine of the angle of rotation of the directive pattern, generating a second local signal whose value corresponds to the cosine of the angle of rotation of the directive pattern, and forming a cardioid function from signals produced by the transducing arrangement, in response to an acoustic source, and the first and second local signals. A spectral analyzer is provided for producing analysis signals proportional to the square of the amplitude of a frequency component of the cardioid function and means are provided for deriving product signals proportional to the analysis signals derived at a given angle of rotation of the directive pattern, multiplied by the corresponding value of the first local signals. A plurality of product signals are derived during at least one revolution of the cardioid directive pattern so as to produce a sum signal indicative of the direction of the acoustic source.

3 Claims, 1 Drawing Figure

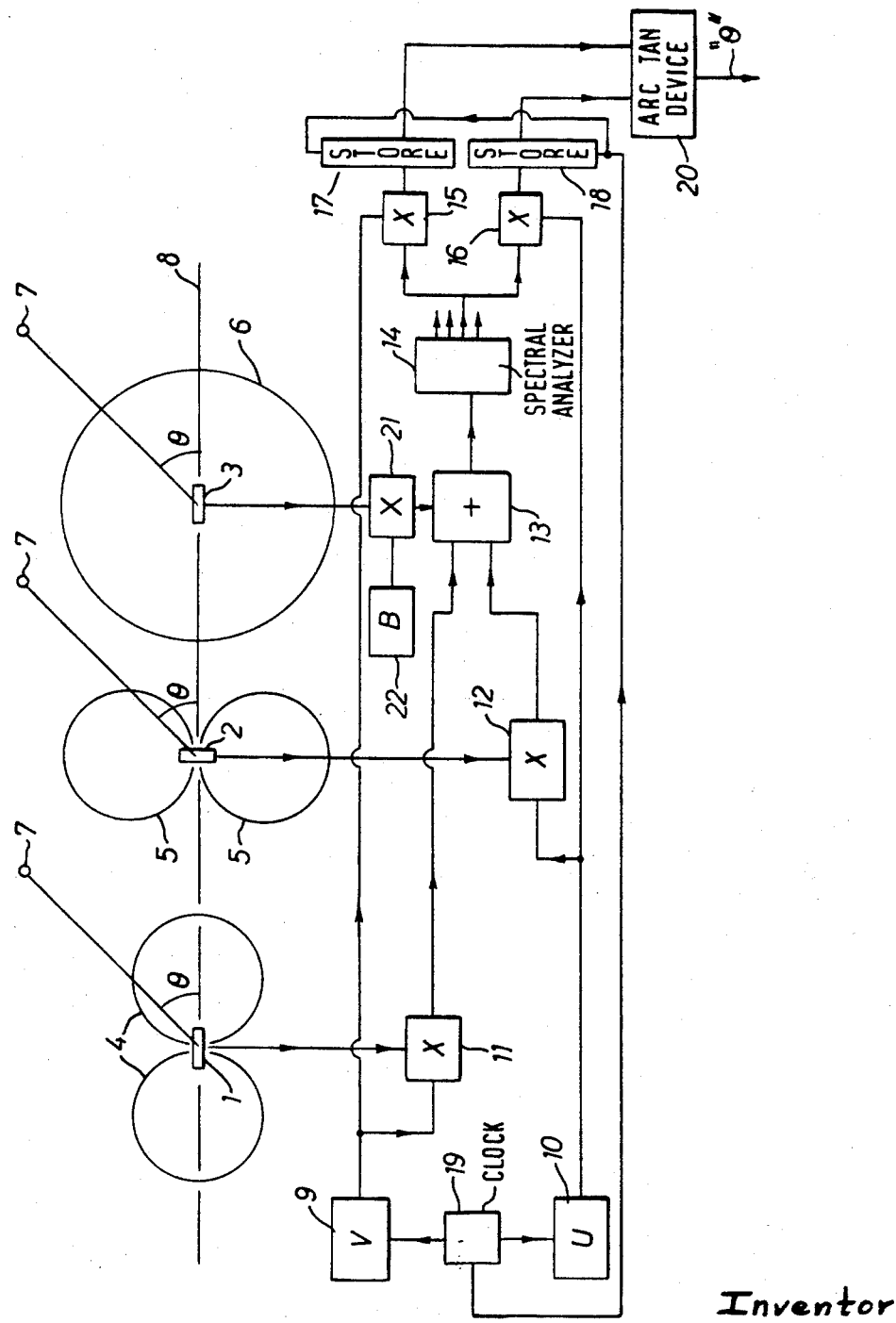

ACOUSTIC DIRECTION SENSING SYSTEMS

The present invention relates to acoustic detection systems, especially to such systems adapted as direction sensing systems.

It is an object of the present invention to provide an acoustic detection system suitable for use underwater, where there is a substantial omni-directional ambient acoustic noise level, without the use of highly directional or selective acoustic transducers, and yet providing a significant improvement in the system output signal to noise ratios.

According to the present invention, there is provided an acoustic detection system comprising acoustic transducing means for producing a rotating cardioidal shaped directive pattern, means for generating a first local signal whose value corresponds to the sine of the angle of rotation of said directive pattern, means for generating a second local signal whose value corresponds to the cosine of said angle of rotation, and means for deriving a cardioid function from signals produced by said transducing means, in response to an acoustic source, and said first and second local signals, a spectral analyzer for producing analysis signals proportional to the square of the amplitude of a frequency component of said cardioid function, means for deriving product signals proportional to said analysis signals derived at a given angle of rotation of said directive pattern multiplied by the corresponding value of said first local signal, and means for summing a plurality of product signals derived during at least one revolution of said cardioidal directive pattern for producing a sum signal indicative of the direction of said acoustic source.

Preferably there is also included means for deriving further product signals proportional to said analysis signals derived at a given angle of rotation of said cardioidal shaped directive pattern, multiplied by the corresponding value of said second local signal and means for summing a plurality of further product signals derived during at least one revolution of said cardioidal directive pattern so as to produce a further sum signal which is a function of the direction of said source, whereby said direction may be more easily computed by means of said sum and further sum signals.

In order that the present invention may be fully understood and readily carried into effect it will now be described with reference to the single FIGURE of the accompanying drawings, which shows a block diagram of one example of an acoustic detection system according to the present invention adapted as a direction finding system.

In the example of a system according to the present invention the acoustic transducing means is made up of an arrangement of three acoustic transducers, one with a substantially omni-directional directive pattern, and two with "figure-of-eight" directive patterns with their patterns at right angles to one another, and means for processing the outputs of said transducers to produce an effectively rotating cardioidal beam. The output signals from this arrangement, (if necessary transmitted to a remote location), are first subjected to a spectral analysis to produce a spectral distribution, and the spectral lines are then processed by multiplication and summing.

The single FIGURE of the accompanying drawings shows three acoustic transducers 1, 2 and 3, transducers 1 and 2 having "figure-of-eight" directive patterns 4 and 5 respectively, arranged at right angles to one another, and transducer 3 having an omni-directional directive pattern 6. It is assumed that the three transducers are co-sited, although for clarity they are not shown thus. The responses $X_1(t)$, $X_2(t)$ and $X_3(t)$ respectively of each transducer to a zero mean signal $s(t)$ from a source 7 at an angle $\theta$ to the line 8 are given by:

$X_1(t) = A\, s(t) \cos \theta$
$X_2(t) = A\, s(t) \sin \theta$
and
$X_3(t) = A\, s(t)$ where A is a constant.

Assume two local signals $V(t)$ and $U(t)$ are generated, given by:

$V(t) = B \sin \omega t$
and
$U(t) = B \cos \omega t$ where B is a further constant, then by appropriate multiplications and additions the following signal can be synthesized:

$X(t) = X_1 V + X_2 U + X_3 B$
$= AB \{1 + \sin (\omega t + \theta)\} s(t)$

The amplitude of the signal $ABs(t)$ thus varies with the co-efficient:

$H = 1 + \sin (\omega t + \theta)$ which is equivalent to a cardioidal directive pattern rotating at a rate $\omega$, the phase of which with respect to $V(t)$ gives the source bearing $\theta$. In this example of a system according to the present invention however, the resultant cardioidal directive pattern is rotated in discrete steps, each moving the beam by an angle $\beta$ and remaining fixed for a time $T_F$ required for a spectral analysis to take place. Thus $\omega t = k\beta$ where $k = 1, 2 \ldots n$, $n$ being the number of steps in a complete rotation with:

$\beta n = 2\pi$.

Thus in the example of the present invention, the effect of rotation in discrete steps is provided by using the outputs of the circuits contained in blocks 9 and 10. The function $V(t)$ used in this example of the invention is a step function. $V(t)$ instantaneously changes, after a fixed time $T_F$, from a D.C. voltage of value $B \sin k\beta$ to a D.C. voltage of value $B \sin [(k+1)\beta]$. $U(t)$ is a similar function which instantaneously changes, simultaneously with $V(t)$ from a D.C. voltage of value $B \cos k\beta$ to $B \cos [(k+1)\beta]$. The D.C. output comprising $U(t)$ and $V(t)$ are produced by the circuits contained in blocks 10 and 9 respectively. Blocks 10 and 9 each comprise a potentiometer circuit with switches arranged to select values of voltage corresponding to particular values of the respective functions $U(t)$ and $V(t)$ in response to clock pulses from clock 19. Thus the circuits of block 9 can produce one of the following outputs in turn (constituting $V(t)$):

$B \sin \beta$, $B \sin 2\beta \ldots B \sin k\beta \ldots B \sin n\beta$ and block 10 can provide one of the following outputs in turn (constituting $U(t)$):

$B \cos \beta$, $B \cos 2\beta \ldots B \cos k\beta \ldots B \cos n\beta$

Under the control of a clock 19, blocks 9 and 10 provide respective ones of the above outputs one after the other, each lasting for a time $T_F$, and they are applied respectively to multipliers 11 and 12, in which they are multiplied by signals from transducers 1 and 2 respectively. A further multiplier 21 is provided for multiplying the signal from the transducer 3 by the quantity B, a D.C. voltage provided by a potentiometer circuit with a block 22. The outputs of multipliers 11, 12 and 21 are added in an adder 13, thus providing the rotating cardioidal output. Thus the amplitude of any signal output of adder 13 is given by:-

$$X_A = C\{1 + \sin(k\beta + \theta)\}$$

where $C = ABs(t)$.

The output of adder 13 is passed (locally or remotely) to a spectral analyzer 14 in which a signal representative of the power is produced, so that for each value of $k$ an output is produced of the form:

$$X_P = D\{1 + \sin(k\beta + \theta)\}^2 + N_F \ldots \quad (1)$$

where $N_F$ is the total average noise power resulting from the spectral analysis, and independent of $k\beta$ assuming an omni-directional noise field, and D is another constant.

Each output of spectrum analyzer 14 corresponding to a narrow band spectral line is applied to a respective one of multipliers 15 and 16, in which are formed respectively the products $X_P \times V$ and $X_P \times U$, further outputs of blocks 9 and 10 being provided to multipliers 15 and 16 respectively. The result of each multiplication is passed to a respective one of stores 17 and 18 which are under the control of clock 19. The outputs corresponding to individual spectral lines are fed as different respective outputs and individual multiplication and storage is performed for each spectral line, sets of multipliers 15 and 16, and stores 17 and 18 being provided (but not shown for convenience) for each line. When $n = k$, that is after a complete effective rotation, stores 17 and 18 provide outputs which are the sum of the products, say $Y_1$ and $Y_2$ respectively, given by:

$$Y_1 = \sum_{k=1}^{n} D(1 + \sin(k\beta + \theta))^2 \sin k\beta + \sum_{k=1}^{n} N_F \sin k\beta$$

$$Y_2 = \sum_{k=1}^{n} D(1 + \sin(k\beta + \theta))^2 \cos k\beta + \sum_{k=1}^{n} N_F \cos k\beta$$

It can then be shown that:

$$Y_1 = D_n \cos \theta + \sum_{k=1}^{n} N_F \sin k\beta \quad (2)$$

$$Y_2 = D_n \sin \theta + \sum_{k=1}^{n} N_F \cos k\beta \quad (3)$$

Evaluating the noise terms, say $Y_{1,n}$ and $Y_{2,n}$ respectively, and assuming that the spectral analyzer period $T_F$ is long enough to make $N_F$ constant, then:

$$Y_{1,n} = N_F \sum_{k=1}^{n} \sin k\beta = 0 \quad (2a)$$

and $$Y_{2,n} = N_F \sum_{k=1}^{n} \cos k\beta = 0 \quad (3a)$$

This means that as a result of the above processing, signals which are proportional respectively to $\cos \theta$ and $\sin \theta$ and substantially free from noise components are produced from blocks 17 and 18. Thus these signals are passed to an "arc-tan device" 20, which produces an output representative of the bearing angle $\theta$ given by $\tan^{-1} Y_2/Y_1$. Arc-tan device 20 may be of any type known in the art, such as a goniometer.

Actually however due to a normally relatively short time $T_F$, individual samples of $N_F$ corresponding to various values of k would fluctuate. Assume the standard deviation of the population formed by the power values in these samples is given by:

$$\sigma = m\bar{N}_F$$

where $\bar{N}_F$ is the means noise power. Noise represented by equations (2) and (3) above is given by populations of the form $N_F \sin k\beta$.

The variance of each population is therefore:

$$\delta_k = m^2 \bar{N}_F^2 \sin^2 k\beta.$$

and the total variance:

$$\delta_{TOT.} = m^2 \bar{N}_F^2 \sum_{k=1}^{n} \sin^2 k\beta$$

If the summing time were infinitely long, the mean values of $Y_{1,n}$ and $Y_{2,n}$ would still be zero. However summing is only undertaken over a single period of rotation; i.e., using only $n$ samples of noise. This means that the mean value of residual noise power remaining after summing has a standard deviation of the mean given by:

$$\Delta = \delta/n \text{ TOT.} \cong m\bar{N}F/2$$

and this can be accepted as the residual noise after summing, so that the signal to noise ratios of the cosine and sine channels are given by:

$$\left(\frac{S}{N}\right)_1 = \frac{Y_1}{Y_{1,n}} = \frac{D_n \cos \theta}{m N_F} \sqrt{2}$$

$$\left(\frac{S}{N}\right)_2 = \frac{Y_2}{Y_{2,n}} = \frac{D_n \sin \theta}{m N_F} \sqrt{2}$$

The maximum signal to noise ratio before summing is obtained from equation (1) above:

Max $(S/N)_{in} = D/N_F$

Hence ignoring $\sin \theta$ or $\cos \theta$:

$(S/N)_{out} \cong (S/N)_{in} \, n \, \sqrt{2}/m$, which is a significant improvement.

In a practical case with a spectral analysis time $T_F = 5$ seconds and a rotation period $T_R = 300$ seconds, $n = 60$ and $\beta \cong 6°$. Assuming $m = 0.1$:

$(S/N)_{out} = (S/N)_{in} \, 60 \, \sqrt{2}/0.1 = 840 \, (S/N)_{in}$.

an improvement of approximately 29 dB.

The present invention is particularly applicable to sonobuoy applications, but is in no way limited to the example described as other examples in accordance with the invention will suggest themselves to those skilled in the art.

What I claim is:

1. An acoustic detection system comprising an acoustic transducing means for producing a rotating cardioidal shaped directive pattern including means for generating a first local signal whose value corresponds to the sine of the angle of rotation of said directive pattern, means for generating a second local signal whose value corresponds to the cosine of said angle of rotation, and means for deriving a cardioid function from signals produced by said transducing means, in response to an acoustic source, and said first and second local signals, a spectral analyzer for producing analysis signals proportional to the square of the amplitude of a frequency component of said cardioid function, means for deriving product signals proportional to said analysis signals derived at a given angle of rotation of said directive pattern multiplied by the corresponding value of said first local signal, and means for summing a plurality of product signals derived during at least one revolution of said cardioidal directive pattern for producing a sum signal indicative of the direction of said acoustic source.

2. An acoustic detection system according to claim 1 wherein said acoustic transducing means comprises a pair of acoustic transducers with "figure of eight" directive patterns, arranged so their patterns are mutually orthogonal, and an omni-directional acoustic transducer.

3. An acoustic detection system according to claim 1 including means for deriving further product signals proportional to said analysis signals derived at a certain angle of rotation of said cardioidal shaped directive pattern, multiplied by the corresponding value of said second local signal and means for summing a plurality of further product signals derived during at least one revolution of said cardioidal shaped directive pattern for producing a further sum signal, and means for computing the direction of said acoustic source from said sum and further sum signals.

* * * * *

UNITED STATES PATENT OFFICE
CERTIFICATE OF CORRECTION

Patent No. 3,711,820          Dated January 16, 1973

Inventor(s) Bertrand Julian Starkey

It is certified that error appears in the above-identified patent and that said Letters Patent are hereby corrected as shown below:

On the title page, correct the assignee name from "Electric & Musical Industries Limited" to -- EMI LIMITED --

Signed and sealed this 13th day of November 1973.

(SEAL)
Attest:

EDWARD M. FLETCHER, JR.            RENE D. TEGTMEYER
Attesting Officer                  Acting Commissioner of Patents FORM PO-1050 (10-69)                           USCOMM-DC 60376-P69
                                     ☆ U.S GOVERNMENT PRINTING OFFICE : 1969 O—366-334.